United States Patent [19]

Smeltzer

[11] Patent Number: 4,460,073
[45] Date of Patent: Jul. 17, 1984

[54] SHOCK ABSORBER WITH IMPROVED BACK CHECK AND ANTI-DUMP VALVE MECHANISMS

[75] Inventor: Paul Smeltzer, Napierville, Ill.

[73] Assignee: Maremont Corporation, Carol Stream, Ill.

[21] Appl. No.: 389,596

[22] Filed: Jun. 18, 1982

Related U.S. Application Data

[62] Division of Ser. No. 118,311, Feb. 4, 1980, Pat. No. 4,346,794.

[51] Int. Cl.$^3$ ............................................. F16F 9/19
[52] U.S. Cl. ........................... 188/322.13; 188/322.17
[58] Field of Search ................ 188/280, 282, 316–318, 188/322.13, 322.14, 322.15, 322.17

[56] References Cited

U.S. PATENT DOCUMENTS 4,189,033  2/1980  Katsumori ..................... 188/322.17

FOREIGN PATENT DOCUMENTS 1408482  7/1965  France ........................... 188/322.17

Primary Examiner—Duane A. Reger
Attorney, Agent, or Firm—Allegretti, Newitt, Witcoff & McAndrews, Ltd.

[57] ABSTRACT

A shock absorber of the direct acting type for vehicles in which improved riding characteristics are obtained by providing an additional back check valve mechanism and anti-dump valve mechanism. Both valve mechanisms are normally biased in a closed position, are opened in response to an initial pressure increase and move into a second closed position when pressure conditions reach a predetermined value above the lower initial pressure increase level. The back check valve mechanism can be made responsive either to the pressure in the compression space or the rebound space. The anti-dump valve mechanism is carried by the piston and controls initial and low pressure flow between the compression space and rebound space.

2 Claims, 6 Drawing Figures

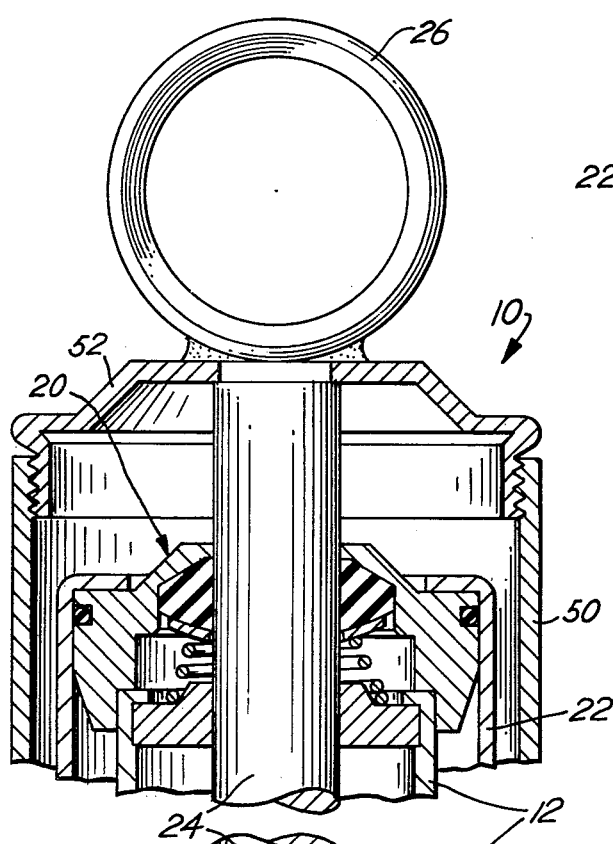
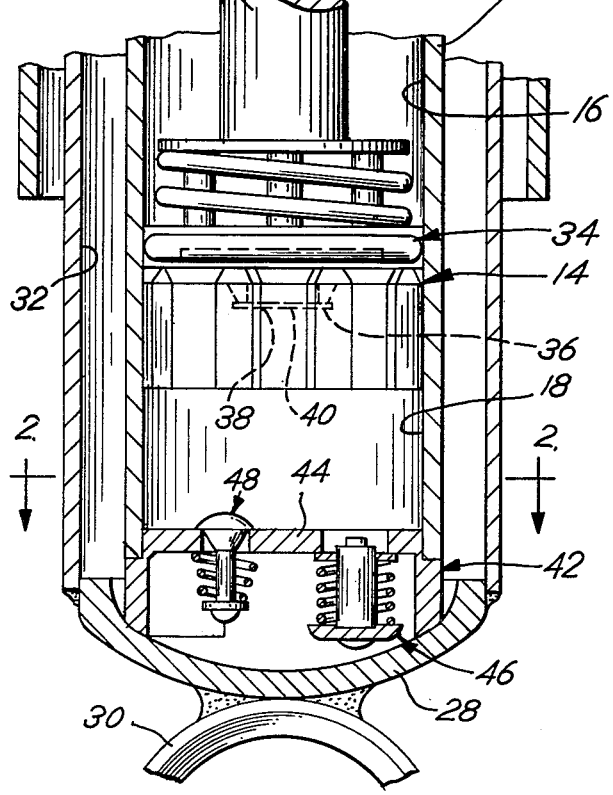
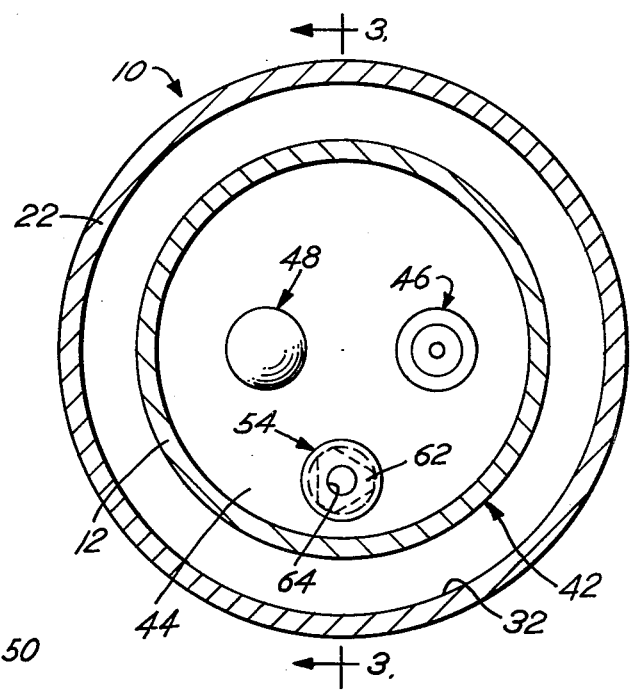
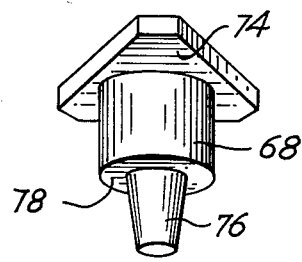

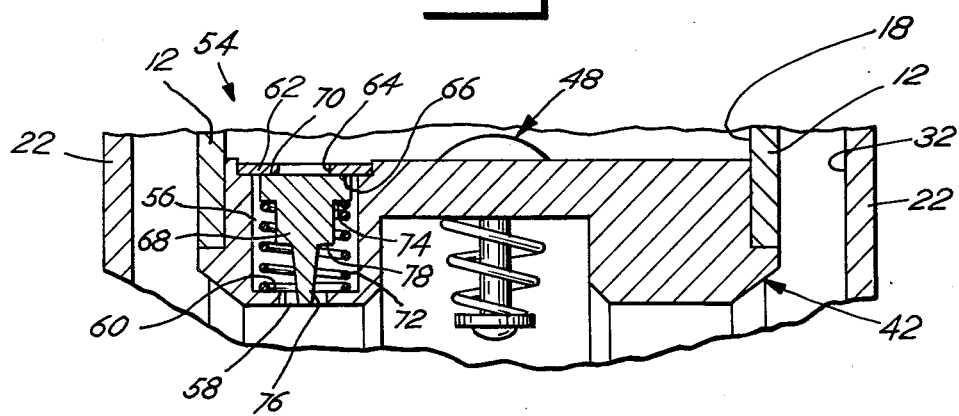
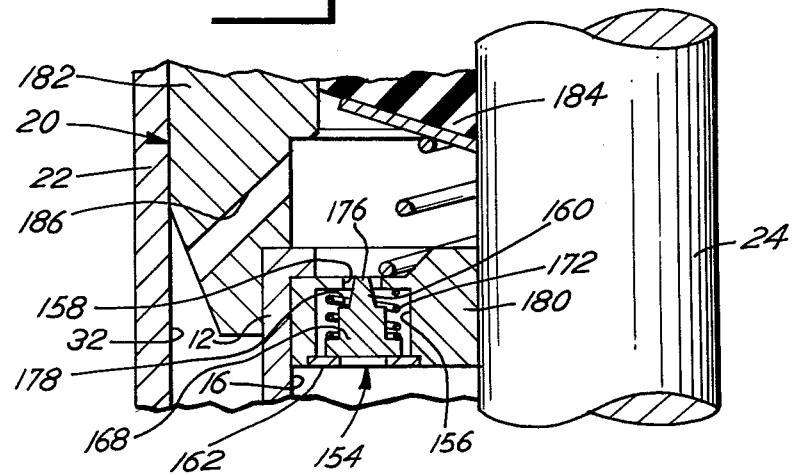
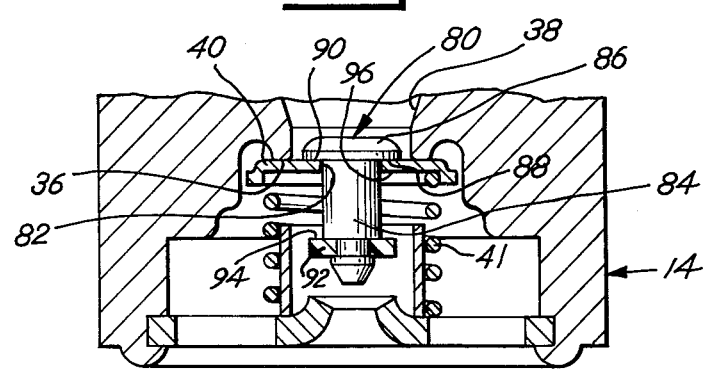

SHOCK ABSORBER WITH IMPROVED BACK CHECK AND ANTI-DUMP VALVE MECHANISMS

This is a divisional of application Ser. No. 118,311 filed Feb. 4, 1980, now U.S. Pat. No. 4,346,794.

This invention relates to shock absorbers and more particularly to improvements in the ride control of shock absorbers used in vehicles.

Vehicles that are designed and utilized for personal transportation are in general equipped with shock absorbers that are designed to provide a comfortable ride and at the same time improve handling and braking characteristics. A number of technical papers have been published that indicate that ride quality is a strong function of a parameter referred to as "jerk". Jerk is defined as the time rate of change of acceleration. In general, the rate of change and the forces applied to the unsprung mass are greatest immediately following the instant of impact of the tire with a surface irregularity. It is therefore in the interest of ride quality to reduce the transmissibility of the suspension system at that short period of time and thus improve the ride. One of the components of the suspension system which effects force transmission is the shock absorber.

To minimize transmissibility requires that static and dynamic friction be minimal and that damping forces be reduced for some short period of time following the commencement of the upward and/or rebound motion of the unsprung mass. However, the damping forces must again be applied to preserve reasonable vehicle directional and braking control. There have been numerous attempts to minimize "jerk" by designing acceleration sensitive shock absorber valving systems. However, such systems are quite sensitive to fluid eddys and perturbations of the inertia mass by forces other than those acceleration forces required for proper operation of the valve system.

It is an object of the present invention to provide a shock absorber having means which will minimize jerk without the attendant disadvantages noted above. In accordance with the principles of the present invention this objective is obtained by providing a hydraulic fluid flow path leading from the compression chamber in addition to those already provided having normally closed valve means therein which will move to an open position permitting flow through the auxiliary flow path at very low fluid pressures. This valve means thus short circuits the normal fluid flow paths and restrictions in the compression chamber and thereby reduces the transmissibility of the shock absorber system for a short interval of time at the beginning of a compression stroke. If the magnitude and duration of the initial acceleration of the axle is sufficient, the pressure responsive valve will move from its normally closed or limited flow position to a fully open position and on to a fully closed position. This valve motion from the limited flow to full flow position reduces initial damping forces and the transmissibility. On the other hand, if the pressure acting on the valve forces it on into the "back check" or closed position, the normal damping forces are restored and shock absorber control is maintained. Very low accelerations of the unsprung vehicle mass which are sufficient to open the valve but do not drive it into the back check position are damped by viscous shear forces within the fluid acting on those adjacent components surfaces, i.e. the piston skirt and the bore of the inner cylinder and the normal valve elements.

In those shock absorbers designed to develop compression damping forces across the piston, provision must be made to replenish the rebound damping chamber with fluid during that compression stroke time period when the back check valve is open. This is necessary to prevent the occurrence of rebound lag. Rebound lag occurs when there is insufficient pressure drop at the base valve to promote fluid flow across the piston into the rebound chamber. Under such conditions, a void develops within the hydraulic fluid in the rebound chamber and this in turn creates a so-called lag in the rebound control. The lag in rebound control is terminated abruptly during rebound with the collapse of the bubble or void in the hydraulic fluid. If not controlled, these circumstances may create an audible disturbance and will affect control.

The above type hydraulic fluid void is prevented from developing by providing a unidirectional low resistance flow path across the piston. This flow path may also be valved such that fluid flow is controlled and timed to coincide with the flow that takes place across the back check valve in the compression head.

Accordingly, it is a further object of the present invention to provide a shock absorber having an additional rebound lag valve which is not only advantageously usable with the back check valve means previously described but has advantageous utility by itself in shock absorbers having otherwise conventional valving therein.

Another object of the present invention is the provision of a shock absorber having an improved means of the type described which is effective in operation, simple in construction and economical to manufacture and maintain.

These and other objects of the present invention will become more apparent during the course of the following detailed description and appended claims.

The invention may best be understood with reference to the accompanying drawings, wherein an illustrative embodiment is shown.

IN THE DRAWINGS

FIG. 1 is a vertical sectional view of a shock absorber embodying the principles of the present invention;

FIG. 2 is an enlarged sectional view taken along the line 2—2 of FIG. 1;

FIG. 3 is an enlarged fragmentary sectional view taken along the line 3—3 of FIG. 2;

FIG. 4 is a perspective view of the back check valve member shown in FIG. 3;

FIG. 5 is an enlarged fragmentary sectional view of the piston valving embodying the principles of the present invention; and FIG. 6 is an enlarged fragmentary sectional view of the upper piston rod closure assembly embodying a modified form of the present invention.

Referring now more particularly to FIG. 1 of the drawings, there is shown therein a direct acting hydraulic shock absorber, generally indicated at 10, adapted to be connected between the sprung and unsprung masses of a vehicle, which embodies the principles of the present invention.

In general, it can be stated that the unit 10 is constructed in the manner set forth in commonly-assigned U.S. Pat. No. 2,507,267, and hence the disclosure of this patent is hereby incorporated by reference into the present specification. For present purposes it is sufficient to note that the shock absorber 10 includes an inner tubular member or cylinder 12, which defines a cylindrical chamber within which is slidably mounted a piston assembly 14. The piston assembly 14 divides the cylinder into an upper rebound space 16 and a lower compression space 18. The upper end of the tubular member 12 has an end closure assembly 20 fixed thereto, which end closure assembly also receives the upper end of an outer tubular member or intermediate cylinder 22.

The end closure assembly 20 serves to slidably sealingly engage the exterior periphery of a piston rod 24 which extends into the rebound space 16 and is suitably connected with the piston assembly 14. The outer end of the piston rod has an appropriate connector 26 fixed thereon which serves to connect the shock absorber 10 to the sprung mass of the vehicle. The lower end of the outer tubular member 22 has an end cap or closure 28 fixed thereto which, in turn, has a connector 30 fixed to the central exterior thereof for connecting the lower end of the shock absorber 10 with the unsprung mass of the vehicle.

It will be understood that the rebound and compression spaces 16 and 18 are filled with hydraulic fluid, which hydraulic fluid also partially fills a replenishing space 32 formed between the exterior of the inner tubular member 12 and the interior of the outer tubular member 22. In order to control the flow of hydraulic fluid from the compression space 18 into the rebound space 16 during the compression movement of the shock absorber 10, there is provided in the piston 14 a spring pressed piston compression valve mechanism, generally indicated at 34. As shown, the compression valve mechanism 34 is constructed in accordance with the teachings contained in the aforesaid U.S. patent.

The piston 14 also defines a downwardly facing annular valve seat 36 which is disposed intermediate the opposite ends of the piston in surrounding relation to a central passage 38. A rebound valve 40 is disposed in cooperating relation with the valve seat 36. The valve 40 is resiliently urged into engagement with the seat 36 by a coil spring 41.

In order to accommodate the piston rod displacement during the telescopic movements of the unit, there is provided a base assembly, generally indicated at 42, which is positioned adjacent the lower end closure 28. The base assembly 42 includes a base member 44 which is fixedly connected with the lower end of the inner tubular member 12 and the interior of the end closure 28. The periphery of the base member 44 provides passages between the replenishing space 32 and the space between the base member 44 and end closure 28. Mounted within the base member 44 is a compression valve assembly 46 and a replenishing valve 48. As shown, the shock absorber 10 also includes an exterior dust tube or outer cylinder 50 which surrounds the intermediate cylinder or outer tubular member 22 and is fixedly connected at its upper end to the juncture between the piston rod 24 and connector 26 as by an annular member 52.

It will be understood that the construction of the shock absorber 10 as thusfar described is similar to the shock absorber described in the aforesaid patent. The details of construction of the components thusfar described are not essential to an understanding of the present invention. Insofar as the details are concerned, reference may be made to the aforesaid patent, the disclosure of which is hereby incorporated by reference into the present specification. It will be understood that the components thusfar described may assume other known configurations. Moreover, the improvements of the present invention are not limited in their applicability to twin tube shock absorbers but would be useful in single tube shock absorbers as well. Consequently, the construction of the shock absorber 10 thusfar described should be considered merely one example of the applicability of the present improvement.

The present invention is more particularly concerned with improvements in the shock absorber 10 which can be added to the conventional components thusfar described to provide improved riding characteristics. A back check valve mechanism, generally indicated at 54, embodying the improvements of the present invention, is best shown in FIGS. 2 and 3. The back check valve mechanism 54 provides an initial alternative or parallel flow control during a compression stroke in addition to the piston compression valve mechanism 34 and base valve assembly 46. The back check valve mechanism 54 is carried by the base assembly 42 and provides a parallel flow path leading from the compression space 18 through to base member 44 into the reservoir space 32. As best shown in FIG. 3, a parallel path is provided by a central passage 56 formed by a counterbore extending through the base plate 44 in annularly spaced relation with respect to the base valve 46 and replenishing valve 48. The lower end of the counterbore defining the passage 56 communicates with an outlet bore 58 and the resulting annular shoulder defines an upwardly facing valve seat 60 surrounding the outlet bore 58. A washer-like element 62 is mounted in fixed relation within the upper end of the counterbore defining a central passage 56. This element provides a central inlet opening 64 which communicates with the compression space and a downwardly facing annular valve seat 66 surrounding the inlet opening 64.

Mounted within the central passage 56 is a back check valve member 68 which includes an upper upwardly facing annular seat engaging surface 70 adapted to engage the downwardly facing annular seat 66. A coil spring 72 is mounted within the central passage 56 and has its lower end engaged with the outer portion of the shoulder defining the upwardly facing seat 60. The upper end of the coil spring engages a downwardly facing peripheral shoulder 74 on the valve member 68 so as to normally bias the same into a position in which the annular seat engaging surface 70 engages the seat 66. As can be seen from FIG. 3, the peripheral portion of the valve member 68 between the upwardly facing seat engaging surface 70 and the downwardly facing shoulder 74 is generally triangular in configuration with the points of the triangle being rounded off so as to generally engage the cylindrical interior periphery of the central passage 56. In this way, the valve member 68 is guided for longitudinal movement within the passage 56 while at the same time permitting flow through the passage peripherally past the valve member 58.

The valve member 58 also includes a depending frustoconical control portion 76, the lower extremity of which when the valve member 68 is disposed in its normally biased position extends within the lower outlet opening 58. The upper extremity of the frustoconical control portion 76 terminates in a downwardly facing annular seat engaging surface 78 adapted to engage the upwardly facing annular seat 60.

In operation, fluid pressure is increased above the compression head during the compression stroke and acts on the upper surface of the valve body that is exposed by the fluid inlet port of the retaining washer. The force generated by the fluid pressure overcomes the valve spring force causing the valve to move downward compressing the valve spring and permitting fluid to flow through the port and past that portion of the valve relieved for flow. The fluid then flows past the guide and control or metering pin portions of the valve member and the back check valve seat 60 and eventually into the reservoir space of the shock absorber 10. The flow thus established serves to reduce the rate at which the pressure normally increases below the damping piston immediately following the initiation of the compression stroke of the shock absorber and thus reduces the transmissibility at that time.

If the impact to the wheel is great enough, the suspension will move upward relative to the chasis at increasingly higher velocities, which results in increasingly greater shock absorber piston velocities and consequently increased fluid pressures and velocities around the back check valve mechanism 54. The increased forces imposed by the fluid will move the back check valve member 68 away from the upper valve seat 66 and toward the back check valve seat 60. The frustoconical metering pin portion 76 will thus progressively throttle the flow of the fluid causing the fluid pressure below the piston to increase gradually which will in turn result in increased fluid flow through the normal compression valves. The back check valve member 68 will eventually move into a closed position wherein the annular surface 78 thereof engages the back check valve seat 60 so that flow through outlet opening 58 is stopped.

Referring now more particularly to FIG. 5, there is shown therein the preferred embodiment of a rebound lag control valve mechanism, generally indicated at 80. As shown, the valve mechanism 80, which also may be termed an anti-dump valve mechanism, is embodied in the rebound valve 40. Specifically, the rebound valve member 40 is formed with a central opening 82 therein. Mounted within the opening is a valve stem 84 of a diameter size smaller than the diameter size of the opening 82. The valve stem has an annular flange portion 86 on the upper end thereof defining a downwardly facing annular seat engaging surface 88. The annular portion of the rebound valve member 40 surrounding the opening 82 provides an upwardly facing valve seat 90 which is engaged by the surface 88. The lower end of the valve stem 84 has a washer-like valve element 92 which extends radially outwardly therefrom and defines an upwardly facing annular valve seat engaging surface 94. The portion of the rebound valve member 40 surrounding the opening 82 also defines a downwardly facing annular seat 96 which is adapted to be engaged by the annular surface 94.

The valve member defined by the valve stem 84 and flange 86 is shown as being made of brass, however, it may be formed as a molded plastic element along with the element 92 which would have either a central opening surrounded by a flexible lip or short flexible projections that would engage the circumferential groove on the lower portion of the valve body. The diameter of the element 92 is larger than the central opening 82 in the recoil valve member 40 and thereby is capable of restricting flow through the opening. The valve is biased into the closed position shown in FIG. 5 by gravity. Thus, any slight increase in pressure beneath the piston 14 that would result in an imbalance across the valve member 40 would cause the valve surface 88 to lift from the seat permitting fluid to flow from the compression space 18 below the piston 14 to the rebound space 16 above the piston. This relatively free flow path and the exchange of fluid prevents a void volume from forming above the piston during the initial portion of the compression stroke and secondly minimizes the compression damping that occurs across the piston. As is apparent from the drawings, at the time the valve surface 94 engages the lower seat 96 of the recoil valve member 40 the flow at that point is either interrupted or highly restricted.

If it is desired to minimize the transmissibility during both rebound and compression, a back check valve mechanism 154 is incorporated in the upper end closure assembly 20. The base assembly 42 would then contain only the standard valving, the back check valve mechanism 54 embodied therein being eliminated. The anti-dump valve mechanism 80 would remain in the recoil valve member 40 of the piston 14 and would permit relatively unrestricted flow across the piston during the compression stroke with the fluid pressure thus transmitted to the rebound space opening the back check valve mechanism located in the assembly 20 and the fluid again returning to the reservoir space via the drain back hole in the assembly 20. During the rebound stroke the rebound damping pressures would also cause the back check valve mechanism 154 to open and reduce the damping forces in rebound.

Such an arrangement is shown in FIG. 6 wherein the components of the back check valve mechanism 154 are identical with the back check valve mechanism 54 and comparable parts are designated by comparable reference numerals with the prefix 1. It will be noted that the end enclosure assembly 20 includes an inner rigid member 180 which is fixed to the upper end of the inner tubular member 12 or cylinder by rolling over the upper end thereof over the upper peripheral marginal edge portion of the member 180. The back check valve flow path is provided in the member 180 and includes a central passage 156 in the form of a counterbore extending upwardly therein so that the outlet bore 158 communicates with the upper inner end of the counterbore. Thus, it will be appreciated that back check valve member 168 is mounted within the central passage 156 in inverted relation with respect to the arrangement previously described and washer element 162 is formed in the lower end of the passage 156 rather than in the upper end thereof, as before. It will also be noted that the end enclosure assembly 20 includes an upper outer rigid member 182 over which tubular member 22 is rolled and within which a spring pressed wiper seal member 184 is contained. The rigid member 182 includes a drain hole 186 which communicates the outlet opening 158 to the reservoir space 32.

It can be seen that the operation of the back check valve member 168 will function the same as the back check valve member 68 except that the fluid pressure to which the valve member 168 is responsive is contained in the rebound space 16, rather than in the compression space 18.

It thus will be seen that the objects of this invention have been fully and effectively accomplished. It will be realized, however, that the foregoing preferred specific embodiment has been shown and described for the purpose of illustrating the functional and structural principles of this invention and is subject to change without departure from such principles. Therefore, this invention includes all modifications encompassed within the spirit and scope of the following claims.

What is claimed is:

1. A direct acting hydraulic shock absorber adapted to be connected between the sprung and unsprung masses of a vehicle comprising inner and outer tubular members, said inner tubular member defining a cylindrical chamber, a piston slidably mounted within said cylindrical chamber, a piston rod extending from one side of said piston outwardly from one end of said inner tubular member, closure means on said one end of said inner tubular member closing the one end of said outer tubular member and slidably sealingly engaging said piston rod, an end closure on the opposite end of said outer tubular member, connecting means for operatively connecting said shock absorber between said masses, hydraulic fluid filling rebound and compression spaces within said cylindrical chamber on the piston rod side of said piston and on the opposite side thereof respectively and partially filling an annular reservoir space between said inner and outer tubular members, said piston having a passage therethrough, rebound valve means in said piston disposed in cooperating relation with said passage, said piston having compression valve mechanism radially outwardly of said central passage to control flow, compression valve means between said compression space and reservoir space, and replenishing valve means between said compression space and said reservoir space, the improvement which comprises means defining a parallel back check fluid flow path between said rebound space and said reservoir space and check valve means movably mounted within said flow path for movement from a first closed position generally closing said path, into an open position permitting fluid flow through said flow path in response to an initial increase in pressure in said rebound space occasioned by the initiation of a rebound stroke of said piston, and from said open position into a second closed position preventing further flow of fluid through said flow path in response to an increase in the pressure of the hydraulic fluid in said rebound space to a predetermined pressure above the initial increased level, said check valve means including means to progressively restrict flow through said path during a portion of the movement of said check valve means into said second closed position.

2. The improvement as defined in claim 1 further including means carried by said piston defining a parallel anti-dump flow path between said compression space and said rebound space and anti-dump valve means movably mounted within said parallel anti-dump flow path for movement from a normally biased position generally closing said anti-dump flow path into an open position permitting fluid flow through said anti-dump flow path in response to an initial increase in pressure in said compression space occasioned by the initiation of a compression stroke of said piston and from said open position into a closed position preventing further flow of fluid through said anti-dump flow path in response to an increase in the pressure of the hydraulic fluid in said compression space to a predetermined pressure above the initial increased level.

* * * * *